United States Patent
Mori

(10) Patent No.: US 8,144,235 B2
(45) Date of Patent: Mar. 27, 2012

(54) IMAGE PICKUP DEVICE AND IMAGE PICKUP METHOD

(75) Inventor: Yukio Mori, Hirakata (JP)

(73) Assignee: SANYO Electric Co., Ltd., Moriguchi (JP)

( * ) Notice: Subject to any disclaimer, the term of this patent is extended or adjusted under 35 U.S.C. 154(b) by 531 days.

(21) Appl. No.: 12/058,265

(22) Filed: Mar. 28, 2008

(65) Prior Publication Data

US 2008/0246852 A1 Oct. 9, 2008

(30) Foreign Application Priority Data

Mar. 30, 2007 (JP) ................................. 2007-090923

(51) Int. Cl.
*H04N 5/232* (2006.01)
*G06K 9/00* (2006.01)
*G03B 17/00* (2006.01)

(52) U.S. Cl. ........................... 348/345; 382/103; 396/75

(58) Field of Classification Search .................. 348/94, 348/95, 222.1, 345, 347, 352; 382/103; 396/175
See application file for complete search history.

(56) References Cited

U.S. PATENT DOCUMENTS

| | | | |
|---|---|---|---|
| 6,263,162 B1 * | 7/2001 | Yamazaki et al. | 396/55 |
| 7,453,506 B2 * | 11/2008 | Li | 348/333.12 |
| 7,454,130 B2 * | 11/2008 | Chang | 396/55 |
| 7,627,237 B2 * | 12/2009 | Kumaki | 396/55 |
| 7,734,098 B2 * | 6/2010 | Kikkawa et al. | 382/195 |
| 2002/0063779 A1 * | 5/2002 | Kaneda et al. | 348/208 |
| 2004/0207743 A1 * | 10/2004 | Nozaki et al. | 348/333.12 |
| 2007/0030381 A1 * | 2/2007 | Maeda | 348/345 |

FOREIGN PATENT DOCUMENTS

| | | |
|---|---|---|
| JP | S54-25819 | 2/1979 |
| JP | H01-232315 A | 9/1989 |
| JP | H04-373371 A | 12/1992 |
| JP | 06-022263 | 1/1994 |
| JP | H09-189934 A | 7/1997 |
| JP | 2004-101616 A | 4/2004 |
| JP | 2004-109247 | 4/2004 |
| JP | 2004-320286 A | 11/2004 |
| JP | 2005-117316 | 4/2005 |

(Continued)

OTHER PUBLICATIONS

Yoav Freund et al., A decision-theoretic generalization of on-line learning and an application to boosting, Sep. 20, 1995, p. 1-p. 34, AT&T Bell Laboratories, Murray Hill, NJ.

(Continued)

*Primary Examiner* — Nhan T Tran
*Assistant Examiner* — Trung Diep
(74) *Attorney, Agent, or Firm* — NDQ & M Watchstone LLP

(57) ABSTRACT

An easy-to-carry image pickup device is provided to obtain images with multiple view angles in which a target subject is positioned in an appropriate size. When capturing an image of a person as a target subject, the size and position of the person's face in the image are detected as a specified part, and a zoom magnification ratio for a lens unit and a shift amount of the incident light position for a light-axis shifting unit are automatically controlled based on the detected size and position of the person's face, so that the person's face has a predetermined size and is positioned in a predetermined position in the image.

25 Claims, 8 Drawing Sheets

FOREIGN PATENT DOCUMENTS

| | | |
|---|---|---|
| JP | 2006-33241 A | 2/2006 |
| JP | 2006-311196 A | 11/2006 |
| JP | 2007-265390 | 10/2007 |

OTHER PUBLICATIONS

Japanese Office Actions issued on Apr. 12, 2011 in the corresponding Japanese Patent Applications No. 2007-090923; 2011-003834; 2011-022829; 2011-022830; and 2011-022831.

Japanese Office Actions issued on Jul. 19, 2011 in the corresponding Japanese Patent Applications No. 2011-022830 & 2011-022831 and Japanese Amendments issued on Jun. 13, 2011in the corresponding Japanese Patent Applications No. 2007-90923; 2011-3834; 2011-22829; 2011-22831; & 2011-22830.

* cited by examiner

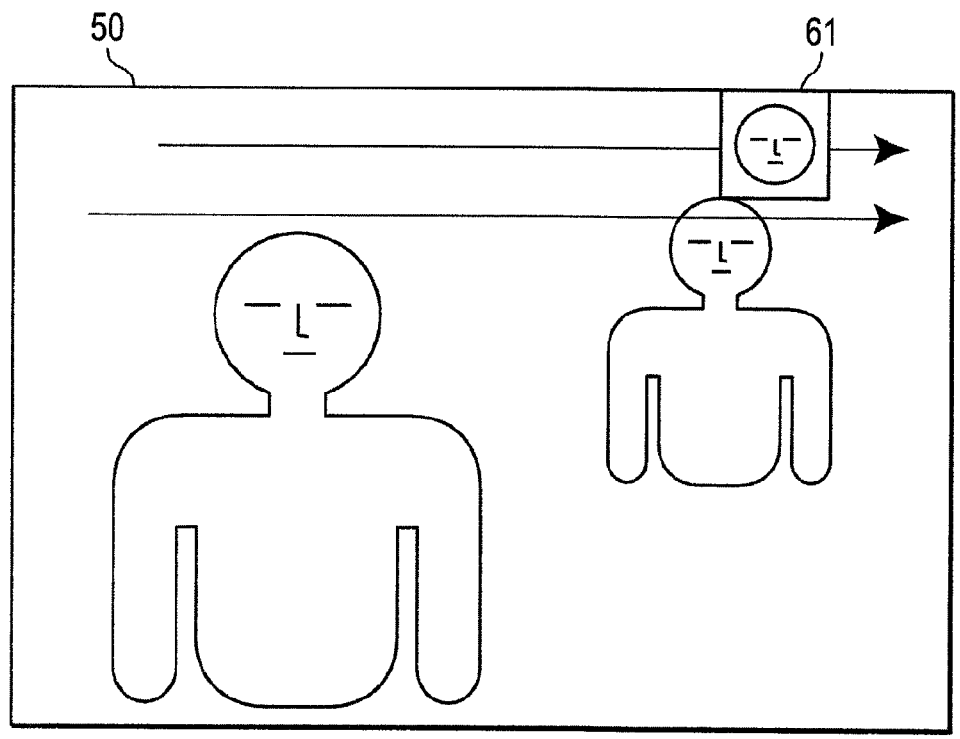

IMAGE PICKUP DEVICE AND IMAGE PICKUP METHOD

CROSS REFERENCE TO RELATED APPLICATIONS

This application claims priority based on 35 USC 119 from prior Japanese Patent Application No. P2007-090923 filed on Mar. 30, 2007, the entire contents of which are incorporated herein by reference.

BACKGROUND OF THE INVENTION

1. Field of the Invention

This invention relates generally to an image pickup device, such as a digital camera, and an image pickup method capable of adjusting the view angles, and more particularly to an image pickup device and an image pickup method for automatically adjusting the view angles relative to a target subject.

2. Description of Related Art

With the developments in various digital technologies, an image pickup device such as a digital camera and a digital camcorder are becoming widely common at the present day. Capturing high-definition images has become possible with the increase in the number of pixels for solid state image sensors such as CCD (Charge Coupled Device) and CMOS (Complementary Metal Oxide Semiconductor) sensors. Moreover, an image pickup device having an optical zoom lens with an automatic focus function also is becoming common, which makes it possible for people not accustomed to using a camera to easily change the view angles by setting the zoom magnification ratio from a wide angle to a telescopic angle and easily capture an image that is in-focus.

However, setting a visual outline or a composition for taking a picture is difficult particularly for a beginner, and there are times when captured images are not composed in a way intended by the photographer, such as that a target subject may be too large or too small, or unrelated background may be captured more widely than the target subject.

A prior solution is disclosed for example in Japanese Laid-Open No. 6-22263, which discloses an image capturing method in which images having wide, telescopic, and intermediate view angles are captured at the same time by automatically capturing an image of a subject in multiple zoom magnification ratios in addition to the zoom magnification ratio set at the time of photography, allowing the photographer to select an image with an appropriate angle of view after the photo-shooting.

Japanese Laid-Open No. 2004-109247 discloses a method in which an image is captured by changing the zoom magnification ratio toward a wider angle than that being set at the time of photography, and from this wider-angle image, an image having the captured range intended by the photographer and an image with the same zoom magnification ratio and having a captured range displaced from the intended captured range are generated, so that the photographer can select an image in an appropriate captured range.

Japanese Laid-Open No. 2005-117316 discloses a method where particularly a person is set as a photographic target, and the position and orientation of the camera is controlled by a moving mechanism so that feature portions of the person's face detected by a detection means for detecting the feature points of the person's face such as the eyes, the ears and the nose are positioned in a reference region within the frame, thereby controlling the position and size of the face to be photographed.

However, the method disclosed in Japanese Laid-Open No. 6-22263 photographs a target subject only by changing the zoom magnification ratios and it does not consider the position of the target subject within the field of view of the image. Therefore, there is a possibility that the automatically photographed images may include a target subject disproportionately positioned at the lower side of the image or a target subject may be cut at a margin of the image.

In the method disclosed in Japanese Laid-Open No. 2004-109247, the obtained image will have inferior resolution if a conventional solid state image sensor is used without modification because the image is being cropped and enlarged to its original dimensions. On the other hand, to maintain the fineness of the image, a larger solid state image sensor needs to be used which necessitates an increase in the size of the image pickup device.

The method disclosed in Japanese Laid-Open No. 2005-117316 uses a camera which is fixed at a single site and has a large-scale moving mechanism for controlling the position and orientation of the camera with many motors such as a rotary motor and a tilt motor, and thus, it is not suited for a portable device.

SUMMARY OF THE INVENTION

This invention was made in view of the above problems, and one object of this invention, therefore, is to provide an image pickup device that can obtain images in which a target subject is appropriately positioned and sized with varied multiple view angles, to provide an image pickup device that is portable without any difficulties, and to provide such an image capturing method.

In order to achieve the above objects, one aspect of the invention provides an image pickup device having: an imaging unit for capturing an image; an image processing unit for detecting a specified part of a target subject from a reference image captured by the imaging unit; a first control unit for controlling a size of the specified part of the target subject such that it becomes a predetermined size; and a second control unit for controlling a position of the specified part of the target subject such that it is positioned in a predetermined position. For the imaging unit, a lens and a solid state image sensor that performs photoelectric conversion of the incident light from the lens to electric signals can be used. The first and second control units can be the same control equipment. As a method to set the specified part of the target subject in a predetermined size, a zoom function of the lens can be used. As a method to place the specified part in the predetermined position, a light-axis shifting function or cropping of the image can be adopted.

Another aspect of the invention provides an image pickup device having: a lens unit having a lens with an optical zoom function; a solid state image sensor for performing photoelectric conversion of an incident light from the lens to electric signals; an image processing unit for detecting a specified part of a target subject from the image of the electric signals obtained by the solid state image sensor; a light-axis shifting unit for adjusting a position of the light axis of the incident light entering the solid state image sensor through the lens unit; and a control unit for computing a zoom magnification ratio for the lens unit and a shift amount of the position of the incident light for the light-axis shifting unit based on the size and position of the specified part of the target subject detected by the image processing unit, such that the specified part has a predetermined size and is positioned in a predetermined position. When the target subject is photographed, the control unit computes the zoom magnification ratio and the shift amount from the size and position of the specified part of the target subject, and an automatically-set composition image containing the specified part of the target subject with the predetermined size and in the predetermined position is photographed by setting the zoom magnification ratio to the computed ratio and the shift amount to the computed shift amount. As the light-axis shifting unit, a drivable shift lens provided between the imaging lens and the solid state image sensor or a parallel-displaceable solid state image sensor can be used. If the target subject is a person, the specified part may be the face.

There may be a plurality of predetermined sizes for the specified part as the criteria for computing the zoom magnification ratio for the lens unit, and a plurality of the automatically-set composition images may be captured.

Moreover, the automatically-set composition image may designate the orientation of the specified part within the image such that the center of the specified part is positioned in the upper half of the image. The automatically-set composition image also may contain roughly the whole of the target subject, roughly the half of the target subject including the specified part, or may have the specified part as the main component of the automatically-set composition image. The distance between the line passing the center of the image in the horizontal direction and the line passing the center of the specified part in the horizontal direction may be set larger in a wide angle image than in a telescopic image. There may be a plurality of the predetermined positions for the specified part as the criteria for computing the shift amount of the incident light position for the light-axis shifting unit, and a plurality of the automatically-set composition images may be taken.

The automatically-set composition image may contain the specified part at one of the left, center, and right positions of the image in the horizontal direction for the same angle of view.

Also, when a plurality of the specified parts are detected, the zoom magnification ratio for the lens and the shift amount of the incident light position for the light-axis shifting unit may be determined based on the height of the region containing all of the plurality of the specified parts, the height of a specified part having the largest height, and the height of the whole image in order to obtain the automatically-set composition image.

Also, capturing an automatically-set composition image may be prohibited for an image in which either the computed zoom magnification ratio or the computed shift amount falls outside of a variable range for the zoom magnification ratio for the lens or the shift amount for the light-axis shifting unit.

In addition to the automatically-set composition images, an image also may be captured to have a composition with the zoom magnification ratio and the shift amount set at the time of photography.

Still another aspect of the invention provides an image pickup method that includes: detecting a specified part of a target subject from an image of the electric signals obtained by a solid state image sensor for performing photoelectric conversion of an incident light to electric signals; computing a zoom magnification ratio for the lens unit and a shift amount of the incident light position for the light-axis shifting unit based on the detected size and position of the specified part of the target subject, such that the specified part has a predetermined size and a predetermined position; setting the zoom magnification ratio of the lens unit to the computed zoom magnification ratio and the shift amount of the incident light position for the light-axis shifting unit to the computed shift amount; and capturing an automatically-set composition image containing the specified part of the target subject having the predetermined size and the predetermined position.

BRIEF DESCRIPTION OF THE DRAWINGS

FIG. 6 is a figure for explaining the face detection processing;

FIG. 7 shows a relation between the variable range for the focal length of the lens and the computed focal lengths necessary to obtain LS, MS, and TS images;

DETAILED DESCRIPTION OF EMBODIMENTS

Preferred embodiments of the invention will be described below with reference to the accompanying drawings. The same reference numbers are assigned to the same parts in each of the drawings being referred to, and overlapping explanations for the same parts are omitted in principle. An image pickup device such as a digital camera and a digital camcorder that performs the photography method of the invention will be explained below. The image pickup device can be a device that performs video recording as long as it can capture a still image.

(Configuration of the Image Pickup Device)

Figure 1:
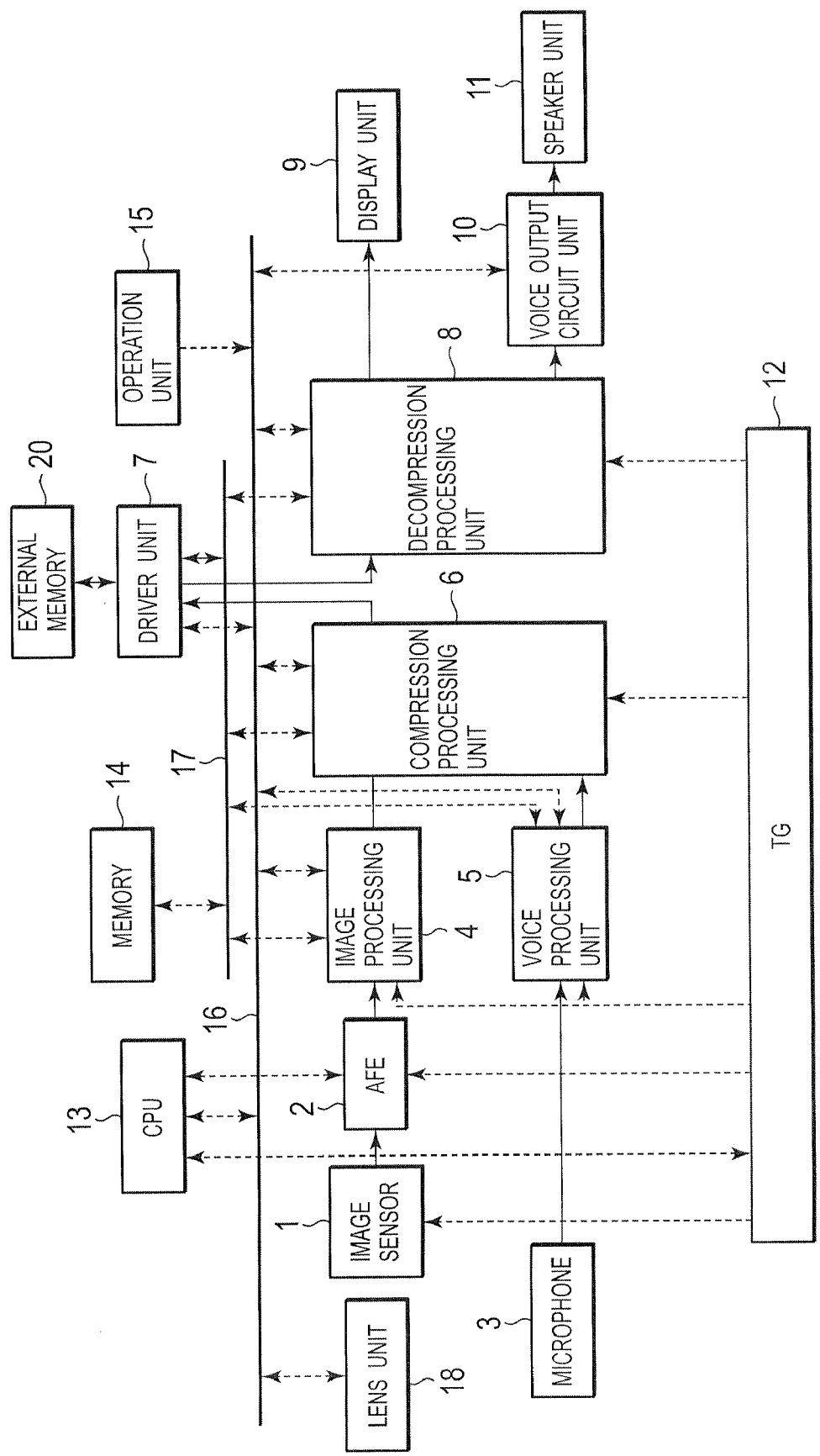
FIG. 1 is a block diagram showing an internal configuration of the image pickup device according to one embodiment of the invention.

First, an internal configuration of the image pickup device will be explained by referring to the drawings. FIG. 1 is a block diagram showing the internal configuration of the image pickup device.

The image pickup device of FIG. 1 includes: a solid state image sensor (an image sensor) 1 such as a CCD sensor or a CMOS sensor that converts the incident light to electric signals; a lens unit 18 having a zoom lens for providing the subject's optical image to the image sensor 1 and a motor for changing the focal length of the zoom lens, i.e. the optical zoom magnification ratio; an AFE (Analog Front End) 2 for converting the analog image signals outputted from the image sensor 1 to digital signals; a microphone 3 that converts the voice inputted from outside to electric signals; an image processing unit 4 for performing various image processing on the digital signals from the AFE 2 including face detection processing; a voice processing unit 5 for converting analog voice signals from the microphone 3 to digital signals; a compression processing unit 6 that performs compression coding processing, such as JPEG (Joint Photographic Experts Group) compression system on the image signals from the image processing unit 4 in the case of photography of a still image, or MPEG (Moving Picture Experts Group) compression system on the image signals from the image processing unit 4 and the voice signals from the voice processing unit 5 in the case of video shooting; a driver 7 that saves the compression-encoded signals that were compression-encoded at the compression processing unit 6 to an external memory 20 such as an SD card; a decompression processing unit 8 that decompresses and decodes the compression-encoded signals read out from the external memory 20 at the driver 7; a display unit 9 that displays an image from the image signals decoded and obtained at the decompression processing unit 8; a voice output circuit unit 10 that converts the voice signals from the decompression processing unit 8 to analog signals; a speaker unit 11 for playing back and outputting the voice based on the voice signals from the voice output circuit unit 10; a timing generator (TG) 12 for outputting timing control signals to match operation timings of each of the blocks; a CPU (Central Processing Unit) 13 for controlling driving operations of the entire image pickup device; a memory 14 for storing each program to perform each operation and for temporarily storing data at the time of program execution; an operation unit 15 to which instructions from the user are inputted, including a shutter button for taking a still image; a bus line 16 for exchanging data between the CPU 13 and each of the blocks; and a bus line 17 for exchanging data between the memory 14 and each of the blocks. In response to the image signals detected by the image processing unit 4, the CPU 13 drives the motor to control the focus, aperture, optical zoom-magnification ratio, and optical axis shifting for the lens unit 18.

Figure 2:
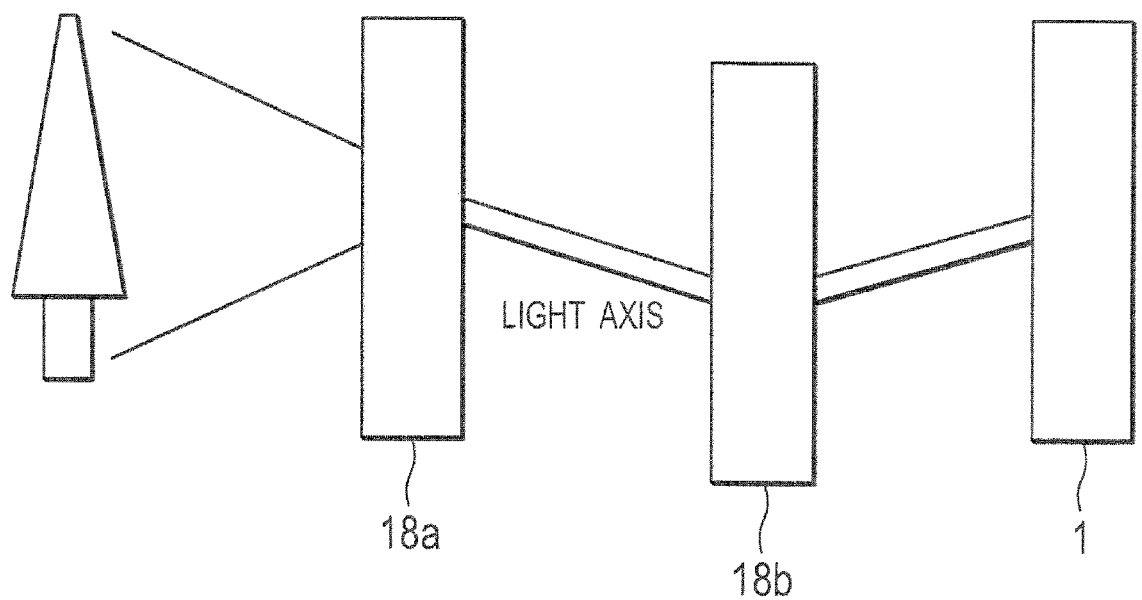
FIG. 2 is a schematic view showing a relation among the imaging lens, the shift lens, and the image sensor.

As shown in FIG. 2, the lens unit 18 includes a shift lens 18b provided between an imaging lens 18a and the image sensor 1, and the shift lens 18b is moveable in parallel relative to the acceptance surface of the image sensor 1. The position of the shift lens 18b can be controlled by the CPU 13, and the shift lens 18b can be shifted such that the light axis of the incident light from the imaging lens 18a is positioned at a predetermined position on the image sensor 1.

(Basic Operations of the Image Pickup Device at the Time of Still Image Photography)

Next, basic operations of the image pickup device according to one embodiment at the time of capturing a still image will be explained by referring to the flow chart of FIG. 3. First, when a user turns on the power of the image pickup device (step 101), the photography mode for the image pickup device, i.e. the operation mode for the image sensor 1 is set automatically to a preview mode (step 102). In the preview mode, image signals which are analog signals obtained by the photoelectric conversion of the image sensor 1 are converted to digital signals at the AFE 2, subjected to image processing at the image processing unit 4, then compressed at the compression processing unit 6, and the image signals for the compressed image are temporarily stored at the external memory 20. These compressed signals are decompressed at the decompression processing unit 8 via the driver 7, and the image with the angle of view having the zoom magnification ratio of the lens unit 18 set at the present moment is displayed at the display unit 9.

Then, the user sets the zoom magnification ratio for the optical zoom to a desired angle of view relative to a target subject for photography (step 103). At that time, based on the image signals inputted to the image processing unit 4, the CPU 13 controls the lens unit 18 to perform optimal exposure control (Automatic Exposure: AE) and focus control (Auto Focus: AF). Once the user determines the photography angle of view and the composition, and presses the shutter button of the operation unit 15 half way (step 105), optimization processing for the AE and AF is performed (step 106).

Once the AE and AF are set for photography and the shutter button is fully pressed (step 107), the timing generator 12 provides timing control signals to the image sensor 1, the AFE2, the image processing unit 4, and the compression processing unit 6 respectively so as to synchronize the operation timing of each unit, and it is detected whether or not a face larger than a predetermined size exists in the inputted image signals at the image processing unit 4 (step 108). This face detection processing will be described in more detail below. If no face larger than the predetermined size is detected, then normal photography is performed. On the other hand, if a face larger than the predetermined size is detected, then view angle bracket photography is performed, which will be described in more detail below.

If a face larger than the predetermined size was not detected in the image signals, the driving mode for the image sensor 1 is set to a still image photography mode (step 125), and the raw data of the image signals which are analog signals outputted from the image sensor 1 are converted to digital signals at the AFE 2 and once written into the memory 14 (step 126). These digital signals are read from the memory 14 and various image processing such as signal conversions to generate brightness signals and color difference signals are provided. After the signals to which the image processing was given are compressed into the JPEG format (step 127), the compressed image is written into the external memory 20 (step 124) and the photography is completed. Then, the device goes back to the preview mode (step 102) as a photography standby mode.

(Face Detection Processing)

Next, the face detection processing of this image pickup device will be explained. The image processing unit 4 has a face detection device 40 that can detect a person's face from the inputted image signals. The configuration and operation of the face detection device 40 will be explained below.

Figure 4:
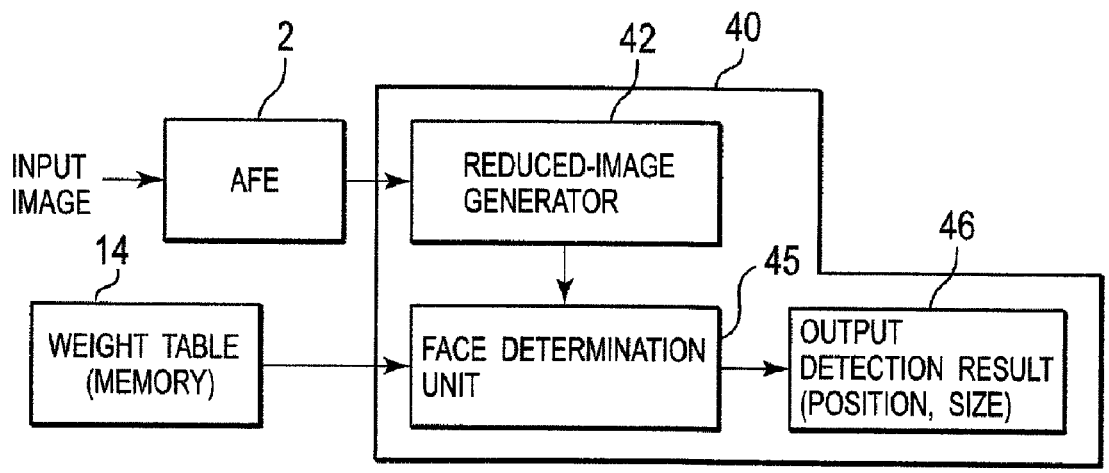
FIG. 4 is a block diagram showing a configuration of the face detection unit.

FIG. 4 shows a configuration of the face detection device 40. The face detection device 40 includes a reduced image generating unit 42 that generates one or multiple reduced images based on the image data obtained at the AFE 2; a face determination unit 45 that determines whether or not a face exists in the inputted image by using each of the hierarchical images which are composed of the inputted image and the reduced images and a weight table for face detection stored in the memory 14; and a detection result output unit 26 that outputs the detection result of the face determination unit 45. When a face is detected, the detection result output unit 46 outputs the size and position of the detected face relative to the inputted image.

The weight table stored in the memory 14 was obtained from a large amount of training samples (face and non-face sample images). Such a weight table can be prepared by utilizing a known learning method called Adaboost (Yoav Freund, Robert E. Schapire, "A decision-theoretic generalization of on-line learning and an application to boosting", European Conference on Computational Learning Theory, Sep. 20, 1995.)

Adaboost is one of the adaptive boosting methods for attaining a high accuracy classifier by selecting multiple weak classifiers that are effective for distinction out of multiple weak classifier candidates, and weighting and integrating them based on a large amount of training samples. Here, the weak classifier is a classifier that has higher classifying ability than pure accident but does not have sufficiently high accuracy. At the time of selecting the weak classifiers, if there already exists a selected weak classifier, the most effective weak classifier is selected from the remaining weak classifier candidates by prioritizing learning for the training samples that falsely recognize based on the already selected weak classifier.

Figure 5:
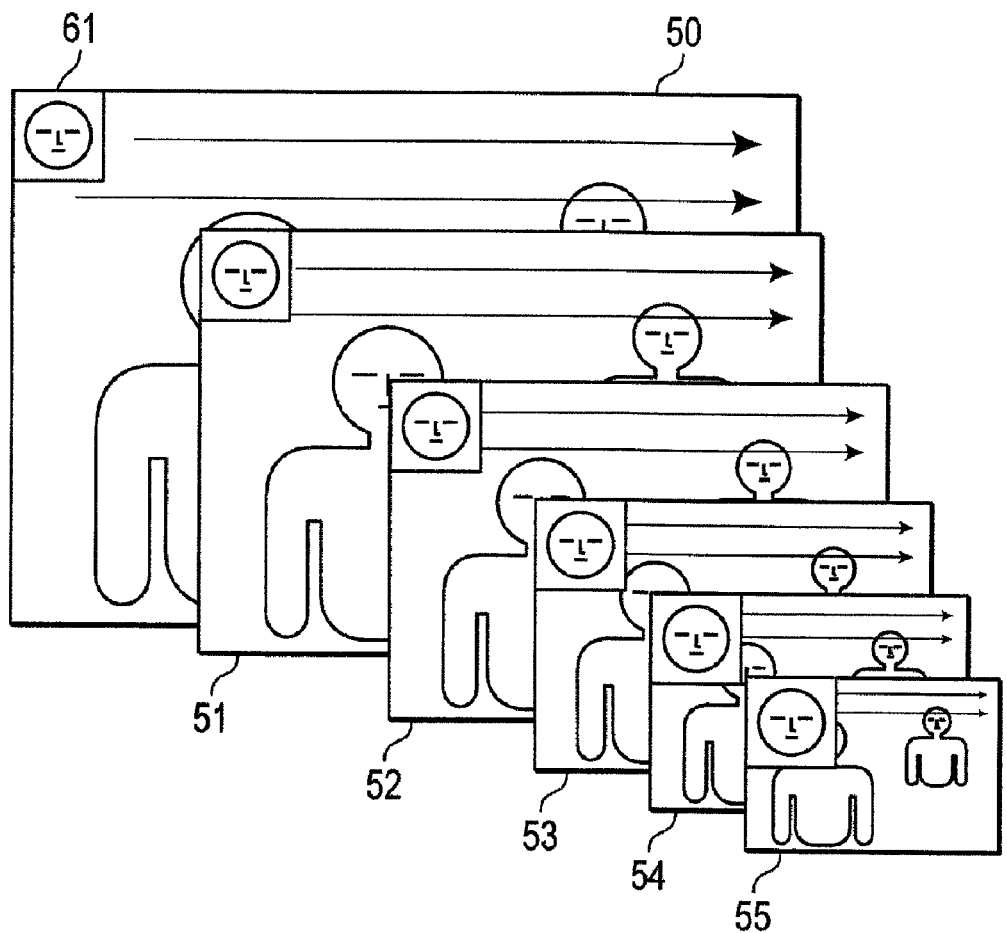
FIG. 5 shows one example of hierarchical images obtained by the reduced-size image generating unit.

FIG. 5 shows one example of the hierarchical images obtained by the reduced-size image generating unit 42. This example shows generated multiple hierarchical images with the reduction ratio R being set to 0.8. In FIG. 5, the reference number 50 indicates the input image and the reference numbers 51 to 55 indicate the reduced-size images. The reference number 61 indicates a determination area. In this example, the determination area is set to have a size of 24×24 pixels. The size of the determination area is the same for the input image and each of the reduced-size images. Also, in this example, as shown by the arrows, face images that match the determination area are detected by performing horizontal scanning to move the determination area from the left to right downward from the top on the hierarchical images. The scanning order, however, can be in any other order. The reason that the multiple reduced-size images 51 to 55 are generated in addition to the input image 50 is to detect various sized faces using one kind of the weighting table.

FIG. 6 is a figure that explains the face detection processing. The face detection processing by the face determination unit 45 is performed for each hierarchical image. Since the processing method is the same, however, only the face detection processing for the input image 50 will be explained here. In FIG. 6, the reference number 50 indicates the input image and the reference number 61 indicates the determination area provided within the input image.

The face detection processing for each hierarchical image is performed by using an image corresponding to the determination area set within the image and the weight table. The face determination processing consists of multiple determination steps that move sequentially from rough determination to finer determination, and when a face is not detected at a certain determination step, the step does not move to the next determination step but it is determined that a face does not exist in that determination area. only when a face is detected in all of the determination steps, it is determined that a face exists in that determination area, and the determination area is scanned and the process moves to determination for the next determination area. As such, the position and size of the detected face is outputted by the detection result output unit 46. Such face detection processing is described in detail in JP Laid Open No. 2007-265390 by the assignee of the present application, and incorporated herein by reference.

(Basic Operation of the Image Pickup Device at the Time of Video Recording)

Now, operation at the time of video recording will be explained. When an image capturing operation is instructed by the operation unit 15 in this image pickup device, analog image signals obtained by the photoelectric conversion of the image sensor 1 are outputted to the AFE 2. At this time, horizontal scanning and vertical scanning are performed at the image sensor 1 by the timing control signals provided from the TG 12, and pixel data image signals for each pixel are outputted. Once raw data for the image signals which are analog signals are converted to digital signals at the AFE 2, and entered to the image processing unit 4, various image processing is provided such as signal conversion processing to generate brightness signals and color-difference signals.

Then, the processed image signals are provided to the compression processing unit 6. At this time, analog voice signals obtained by the microphone 3 are converted to digital signals at the voice processing unit 5 and provided to the compression processing unit 6. At the compression processing unit 6, therefore, the digital image signals and the digital voice signals are compression coded based on the MPEG compression coding system, provided to the driver unit 7, and stored at the external memory 20. Also, at this time, the compressed signals stored at the external memory 20 are read out by the driver unit 7, provided to the decompression processing unit 8, and the image signals are obtained. These image signals are provided to the display unit 9 and the subject image being presently captured through the image sensor 1 is displayed.

When the image capturing operations are performed as described above, the timing control signals are given by the timing generator 12 to the AFE 2, the image processing unit 4, the voice processing unit 5, the compression processing unit 6, and the decompression processing unit 8, and synchronized operations to the image capturing operation of the image sensor 1 for each frame are performed.

When instructions to play back the video or image stored in the external memory 20 are entered through the operation unit 15, the compressed signals stored in the external memory 20 are read out by the driver unit 7 and provided to the decompression processing unit 8. Then at the decompression processing unit 8, the signals are decompressed based on the MPEG compression coding system at the decompression processing unit 8 and the image signals and the voice signals are obtained. Then the image signals are provided to the display unit 9 to play back the image, and the voice signals are provided to the speaker unit 11 via the voice output circuit unit 10 to play back the voice. The video based on the compressed signals stored in the external memory 20 is thus regenerated along with the voice. Also, when the compressed signals include only the image signals, only the image is regenerated at the display unit 9.

(View Angle Bracket Photography)

Next, the view angle bracket photography will be explained. In the image pickup device according to the invention, single or multiple view angle images with a composition in which a person within the image is captured in a predetermined position and size can be automatically obtained at the same time by combining the optical zoom, face detection functions, and the light-axis shifting function. This image capturing method will be called view angle bracket photography below.

Figure 3:
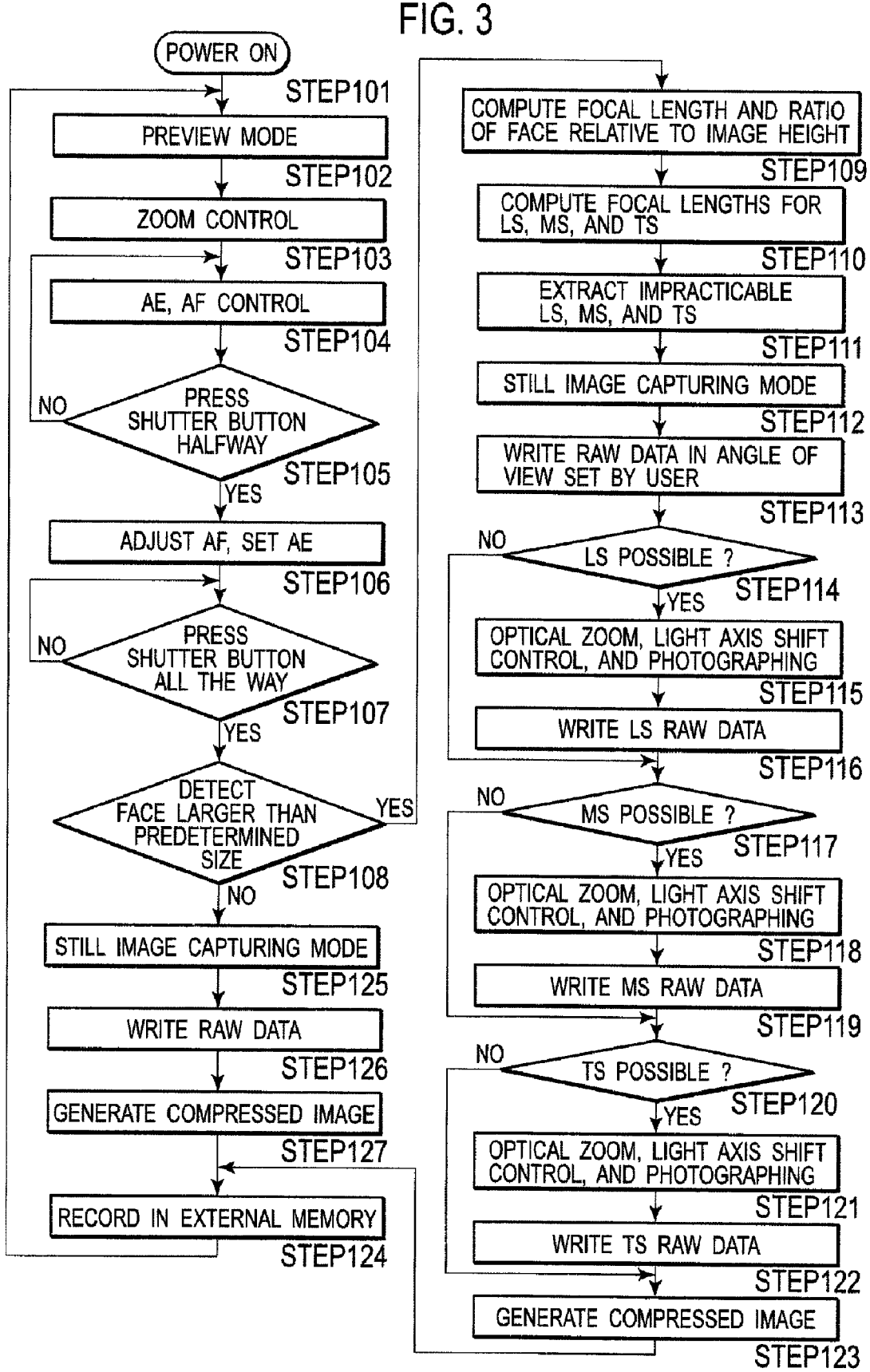
FIG. 3 is a flowchart for explaining basic operations of the image pickup device and view angle bracket photography according to the embodiment.

If a face larger than a predetermined size is detected in the image signals at the step 108 of FIG. 3, the focal length and the ratio of the face relative to the height of the image at the time the shutter button was pressed are computed (step 109).

Next, the focal lengths (zoom magnification ratios and view angles) necessary to capture loose shot (LS), middle shot (MS), and tight shot (TS) images and the amount of light-axis shifting are computed (step 110). Here, LS indicates an angle of view and a composition intended for the entire body; MS indicates an angle of view and a composition intended for the upper body; and TS indicates an angle of view and a composition intended for the face closeup. Shots with their necessary focal lengths to fall outside of the variable range for the focal length of the lens unit 18 are extracted and excluded from the photography coverage (step 111).

FIG. 7 shows a relation between the variable range for the focal length of the lens unit 18 and the focal length necessary to capture the computed LS, MS, and TS images. The focal length becomes shorter towards the left and longer towards the right in FIG. 7. In any of the cases, the focal length at the present moment set by the user is arbitrary as long as it is within the variable range for the focal length of the lens. In the case of (1), all the focal lengths necessary to capture the LS, MS, and TS images fall within the variable range for the focal length of the lens, and therefore there is no shot excluded from the photography coverage. (2) is an example in which a person is positioned far away, and the focal length necessary to capture the TS image is longer than the variable range for the focal length of the lens, making it a shot excluded from the photography coverage. If the person is further away, the MS image also will be a shot excluded from the photography coverage. (3) is an example in which a person is positioned close, and the focal length necessary to capture the LS image is shorter than the variable range for the focal length of the lens, making it a shot excluded from the photography coverage. If the person is closer, the MS image also will be a shot excluded from the photography coverage.

The driving mode for the image sensor 1 is set to the still image capturing mode (step 112), and the raw data of the angle of view set by the user retained at the image processing unit 4 are converted to digital signals and written into the memory 14 (step 113).

If capturing the LS image is possible (step 114), then the image is captured by automatically setting the zoom magnification ratio to that for the LS image computed at the step 110, and shifting the light axis such that the position of the face comes to a predetermined position (step 115). Raw data for the LS image obtained by the photography step of the step 115 are converted to digital signals and written into the memory 14 (step 116). If the LS image photography is not possible, the process moves to the MS image photography.

If capturing the MS image is possible (step 117), then the image is captured by automatically setting the zoom magnification ratio to that for the MS image computed at the step 110, and shifting the light axis such that the position of the face comes to a predetermined position (step 118). Raw data for the MS image obtained by the photography step of the step 118 are converted to digital signals and written into the memory 14 (step 119). If the MS image photography is not possible, the process moves to the TS image photography.

If capturing the TS image is possible (step 120), then the image is captured by automatically setting the zoom magnification ratio to that for the TS image computed at the step 110, and shifting the light axis such that the position of the face comes to a predetermined position (step 121). Raw data for the TS image obtained by the photography step of the step 121 are converted to digital signals and written into the memory 14 (step 122). If the TS image photography is not possible, the process moves to generation of the compressed images.

Various image processing is performed by the image processing unit 4 on the digital signals of maximum total of four images, i.e. an image with the angle of view set by the user and images with the maximum of three view angles that were automatically captured, and the digital signals of the respective images are compressed into the JPEG format (step 123). Then, the compressed images are written into the external memory 20 (step 124) and the photography is completed. Thereafter, the process returns to the preview mode to be in a photography standby state (step 102).

The step 113 to convert the raw data of the image with the angle of view set by the user to digital signals and write them into the memory 14 may be omitted. If the step 113 is omitted, the number of images captured by one shutter operation becomes three images total. Also, a set of the image files photographed at the same time may be managed at the image pickup device as one file group, or they may be managed separately as independent files, and either of these may be selected by the user using the operation unit 15. If the set of the image files is managed as one file group, all the images in the group can be deleted in a lump when the photography itself is unwanted. If they are managed separately as independent files, each image can be selectively deleted in such a case that only the unwanted shots are deleted. As a method to position the face in a predetermined position of the image, trimming or cropping of the captured image may be used rather than shifting the light axis.

Next, the ratios of the face with respect to the height of the image in the LS, MS, and TS images and the positions of the face in the image will be explained. The ratios and the positions in the explanation below are one example and they can be changed arbitrarily.

Figure 8:
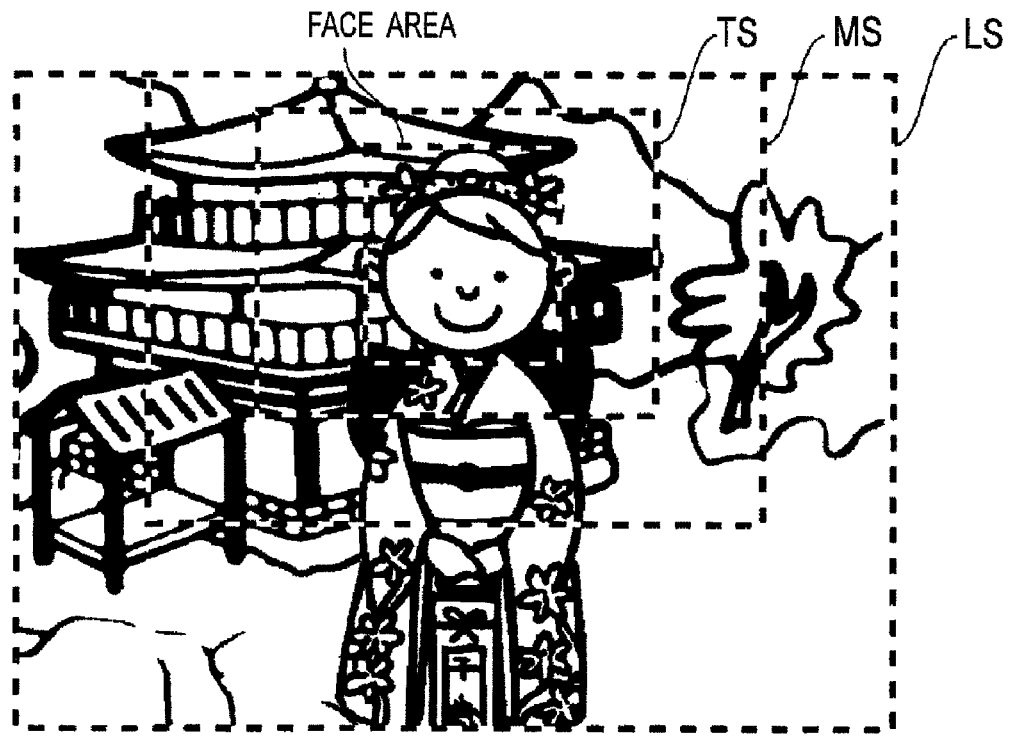
FIG. 8 is a figure showing the relation between the face area and view angles for the LS, MS, and TS images.
Figure 9:
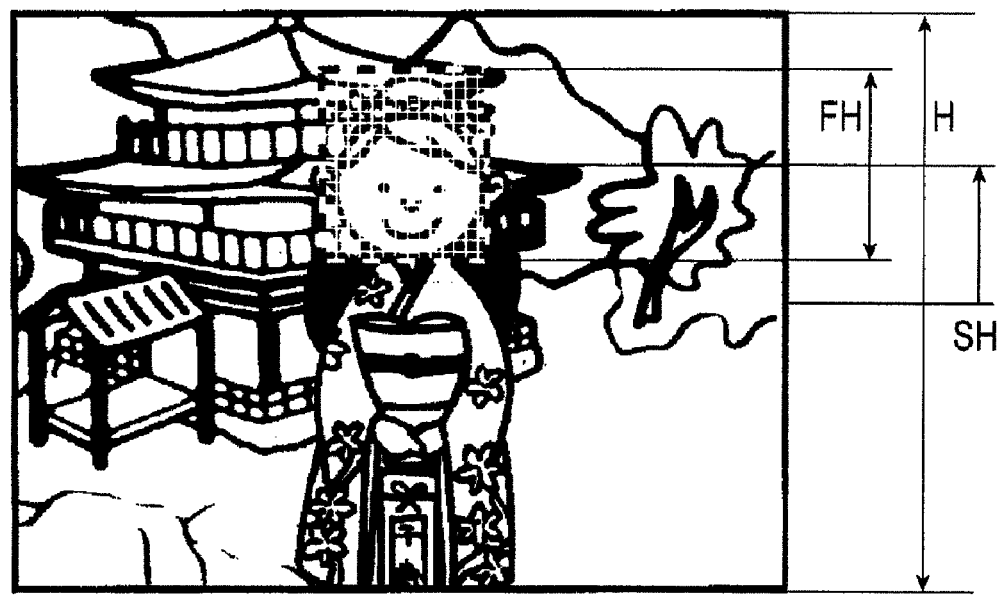
FIG. 9 shows one example of the LS image.
Figure 10:
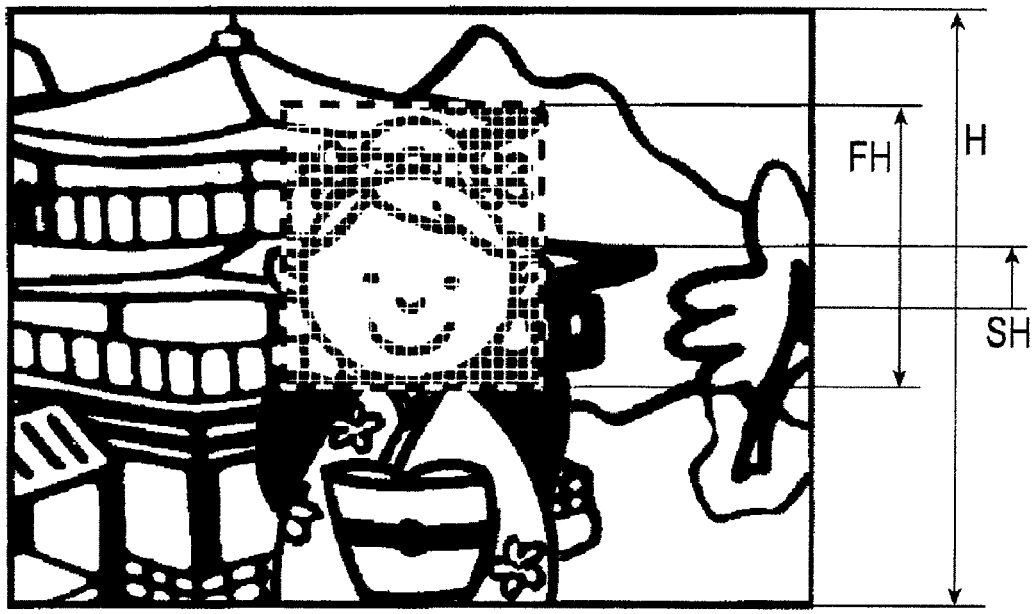
FIG. 10 shows one example of the MS image.
Figure 11:
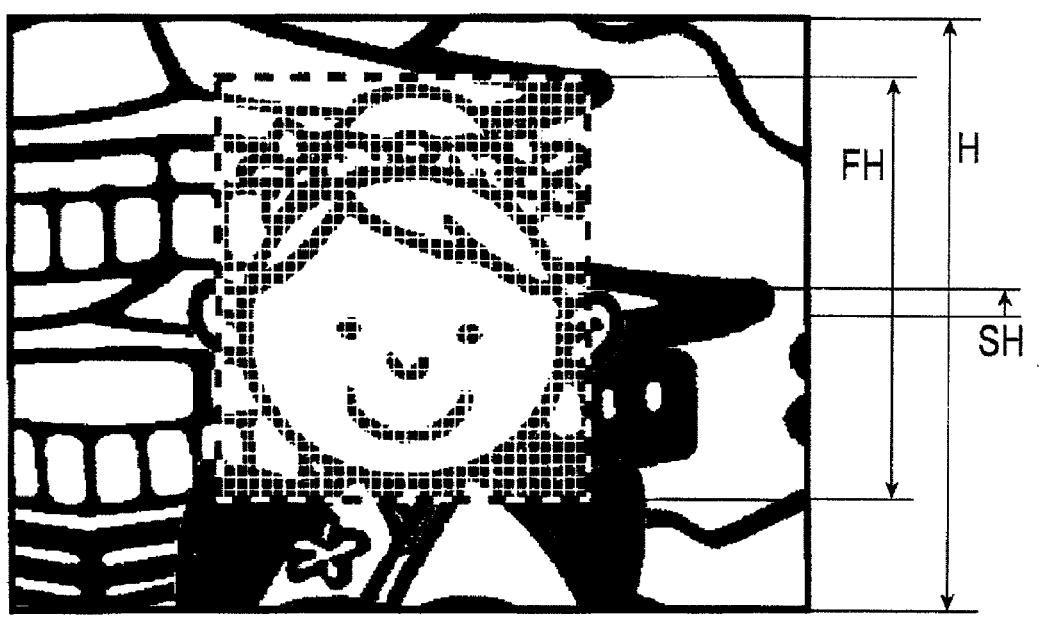
FIG. 11 shows one example of the TS image.

FIG. 8 is a figure showing the relation between the face area and the view angles for the LS, MS, and TS images, and the angle of view set by the user can be either within this range or outside of this range. Also, as described above, LS indicates an angle of view and a composition intended for the entire body; MS indicates an angle of view and a composition intended for the upper body; and TS indicates an angle of view and a composition intended for the face closeup, which are the images shown in FIGS. 9, 10, and 11 respectively. Here, the vertical length of the image, i.e. the height is shown as H; the height of the face area is shown as FH; the distance from the horizontal line that passes the center of the image to the center of the face area is shown as SH.

At the LS, criteria for computing the focal length are set such that for example the height of the face area FH falls within the range of $H/9=FH=H/7$. The position of the face area for example is set as $SH>H/6$, and set such that the center of the face area is positioned above the ⅓ line of the image from the above, so that the body fits in a large range of the image as much as possible. Moreover, it is set to be $H/2>FH/2+SH$, i.e. $SH<(H-FH)/2$ so that the head does not fall outside of the image. In this case, therefore, the position of the face area i.e. the shift amount of the light axis is determined by setting the SH to fall within the range of $H/6<SH<(H-FH)/2$.

At the MS, criteria for computing the focal length are set such that for example the height of the face area FH falls within the range of $H/5=FH=H/3$. The position of the face area for example is set such that the center of the face area is positioned in the upper half of the image, to be $SH>0$, so that the body fits in a large range of the image as much as possible. Moreover, it is set to be $SH<(H-FH)/2$ so that the head does not fall outside of the image. In this case, therefore, the shift amount of the light axis is determined by setting the SH to fall within the range of $0<SH<(H-FH)/2$.

At the TS, criteria for computing the focal length are set such that for example the height of the face area FH falls within the range of $H/3=FH=2H/3$. The position of the face area for example is set such that the center of the face area is positioned in the upper half of the image, to be $SH>0$. Moreover, it is set to be $SH<(H-FH)/2$ so that the head does not fall outside of the image. In this case, therefore, the position of the face area i.e. the shift amount of the light axis is determined by setting the SH to fall within the range of $0<SH<(H-FH)/2$.

The value of the SH is preferably larger in a shot having a wider angle (such as the LS) and smaller in a shot having a more telescopic angle (such as the TS). This is because the face is desirably positioned at an upper side in a shot with a wider angle, whereas the face desirably is not positioned too high from the center of the image in a shot with a more telescopic angle. Therefore, preferably the value for the SH is $SH>H/5$ for the LS, and $SH<H/8$ for the TS, for example. Table 1 shows an example of the LS, MS, and TS settings based on the H, the FH, and the SH.

TABLE 1

|    | FH/H | SH/H |
|----|------|------|
| LS | 1/8  | 1/4  |
| MS | 1/4  | 1/8  |
| TS | 1/2  | 1/16 |

As described above, even when the image captured with an angle of view set by the photographer has a composition with the person's position or size being disproportionate or being halfway, multiple images with ideal view angles and compositions can be captured automatically by the view angle bracket photography, and thus, photography failures can be reduced.

Figure 12:
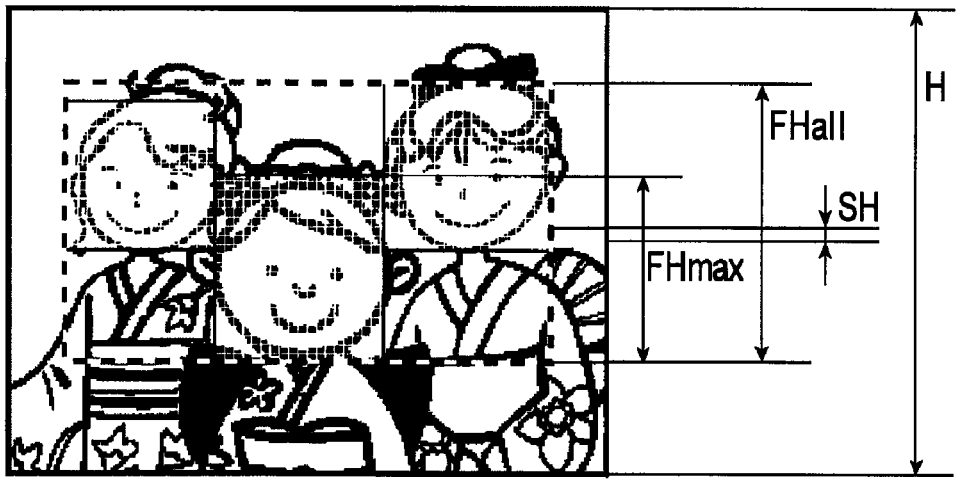
FIG. 12 is a figure for explaining the face area in the case that a plurality of faces are detected.

In the above explanations, an instance in which the target subject is just one person was described. However, the target subject also can be multiple people. In that case, as shown in FIG. 12, after the multiple faces are detected at the step 108, the largest FH value is set as FHmax and the height of the area containing the face areas of all the persons FHall is computed. Then, in order to take into consideration the difference between the area containing the face areas of all the persons and the face area having the largest FH, i.e. (FHall−FHmax) while basing the computation on the face area of the largest FH, the angle of view is computed based on the ratio of FHmax and H−(FHall−FHmax). Here, the SH is based on the center of the area containing the face areas of all the persons.

If the target subject is multiple persons, the setting range of FHmax for the LS, MS, and TS can be determined by substituting the H in the case of the target subject being one person as described above with H−(FHall−FHmax). The SH is the same with the case in which the target subject is one person. Table 2 shows an example of the LS, MS, and TS settings based on the H, the FHmax, the FHall, and the SH.

TABLE 2

|    | FHmax/{H − (FHall − FHmax)} | SH/H |
|----|-----------------------------|------|
| LS | 1/8                         | 1/4  |
| MS | 1/4                         | 1/8  |
| TS | 1/2                         | 1/16 |

Figure 13:
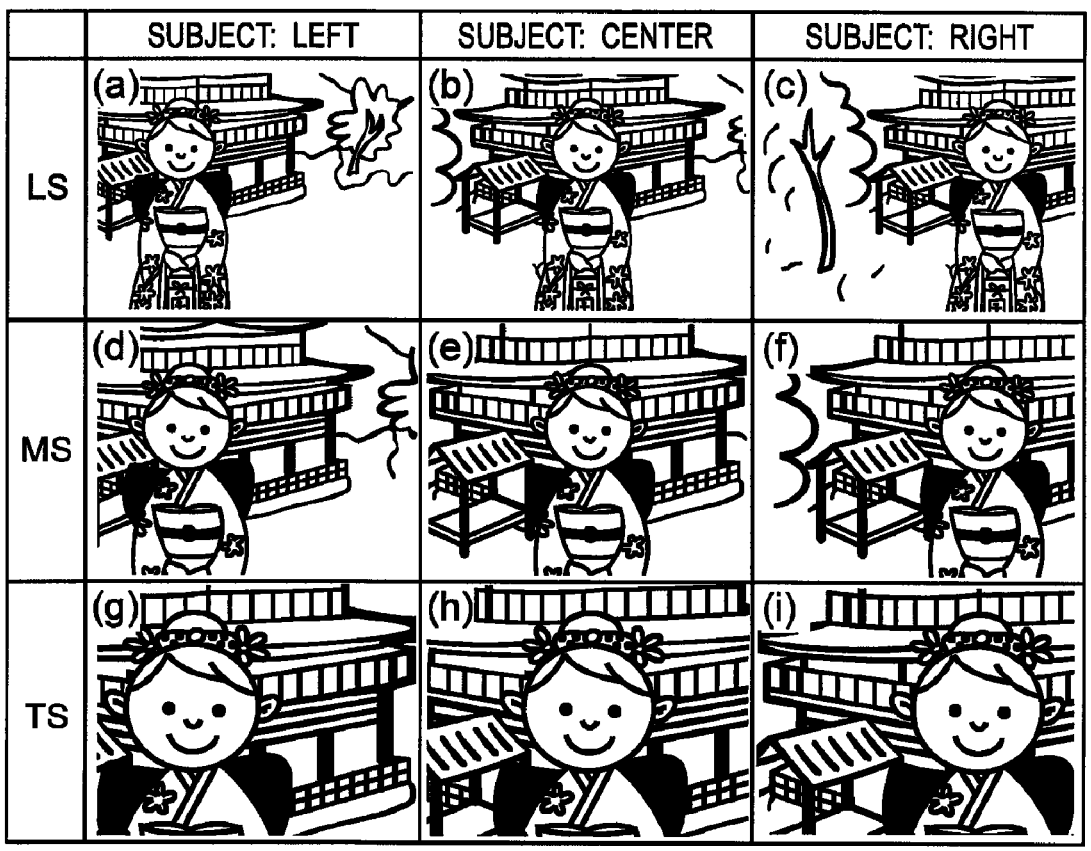
FIG. 13 shows one example of the image compositions for the LS, MS, and TS view angles in which the target subject is positioned at the left, center, and right positions of the image in the horizontal direction.

In the examples described above, the view angle bracket photography was explained in which the target subject was positioned at the center in the horizontal direction. However, the view angle bracket photography according to the invention is not limited to such examples, but it also can have a composition in which the target subject is off the center towards the left or right in the horizontal direction with light-axis shifting of the shift lens 18b. Such view angle bracket photography may include multiple view angles with at least one of the compositions having the target subject at the center of the target image and off the center towards the left or right in the horizontal direction, or such view angle bracket photography may include multiple view angles with all of these compositions. FIG. 13 shows an example of 9 images (a) to (i) with the compositions having the target subject at the left, center, and right relative to the horizontal direction of the image for the LS, MS, and TS view angles respectively. In this case, the shift amount for the light-axis is computed for each composition at the step 110, and the light axis is moved to the left, right, or center and images are photographed at the step 115, 118, and 121.

When the angle of view and the composition set by the user is shifted off the center towards the left or right in the horizontal direction, there may be an instance in which a composition with the subject off the center in the opposite direction from the shifted direction cannot be photographed due to the shifting range limit of the light axis by the shift lens 18. For example, if the angle of view and the composition set by the user is similar to the image (a) of FIG. 13, the shift amount of the light axis to capture images with the compositions of the images (c) or (f) may fall outside of the shifting range. In that case, such compositions can be excluded from the photography coverage at the step 111.

While the specified view angles automatically set for the view angle bracket photography were set as three kinds of the LS, MS, and TS images, it can have four or more kinds, and it also can be user-selectable as to which view angles are used for the view angle bracket photography. Shifting of the light axis is not limited to be performed by the shift lens 18b, but it also can be done by displacing the image sensor 1 in parallel with respect to the acceptance surface.

As described above, the present invention can be applied in an image pickup device having an optical zoom function, a face detection function, and a light-axis shifting function. According to the invention, images having the target subject placed in an appropriate size and an appropriate position can be obtained automatically for multiple view angles with an image pickup device that is easy to carry. Therefore, even when the image captured with an angle of view set by the photographer has a composition with the person's position or size being disproportionate or being halfway, multiple images with ideal view angles and compositions are captured automatically and thus photography failures can be reduced.

The invention may be embodied in other specific forms without departing from the spirit or essential characteristics thereof. The embodiments therefore are to be considered in all respects as illustrative and not restrictive; the scope of the invention being indicated by the appended claims rather than by the foregoing description, and all changes that come within the meaning and range of equivalency of the claims are therefore intended to be embraced therein.

What is claimed is:

1. An image pickup device, comprising:
   a lens unit which has a lens with an optical zoom function;
   a solid state image sensor which performs photoelectric conversion of an incident light from the lens to electric signals;
   an image processing unit which detects a specified part of a target subject from an image of the electric signals obtained by the solid state image sensor;
   a light-axis shifting unit which adjusts a light axis position of the incident light entering the solid state image sensor through the lens unit; and
   a control unit which computes a zoom magnification ratio for the lens unit and a shift amount of the incident light position for the light-axis shifting unit based on the size and position of the specified part of the target subject detected by the image processing unit, such that the specified part has a predetermined size and is positioned in a predetermined position,
   wherein the image pickup device is configured such that when the target subject is photographed, the control unit computes the zoom magnification ratio and the shift amount from the size and position of the specified part of the target subject, and the image pickup device captures an automatically-set composition image containing the specified part of the target subject with the predetermined size and in the predetermined position by setting the zoom magnification ratio to the computed ratio and the shift amount to the computed shift amount.

2. The image pickup device according to claim 1, wherein the automatically-set composition image contains the specified part such that the center of the specified part is positioned in the upper half of the image.

3. The image pickup device according to claim 1, wherein the control unit computes the zoom magnification ratio and the shift amount for a plurality of images having different view angles to capture a plurality of the automatically-set composition images with the different view angles.

4. The image pickup device according to claim 1, wherein the automatically-set composition image contains at least one of roughly the whole of the target subject, roughly a half of the target subject including the specified part, and the specified part as a main component of the automatically-set composition image.

5. The image pickup device according to claim 1, wherein a distance between the line passing the center of the image in the horizontal direction and the line passing the center of the specified part in the horizontal direction is set larger in a wide angle image than in a telescopic image.

6. The image pickup device according to claim 1, wherein the image processing unit is capable of detecting a plurality of the specified parts of the target subjects, and a plurality of automatically-set composition images including the plurality of the specified parts of the target subjects are captured.

7. The image pickup device according to claim 6, wherein when a plurality of the specified parts are detected, the zoom magnification ratio for the lens and the shift amount of the incident light position for the light-axis shifting unit are determined based on a height of a region containing all of the plurality of the specified parts, a height of a specified part having the largest height, and a height of the whole image to obtain the automatically-set composition image.

8. The image pickup device according to claim 1, wherein the automatically-set composition image contains the specified part at least at one of the left, center, and right positions of the image in the horizontal direction for the same angle of view.

9. The image pickup device according to claim 1, wherein capturing the automatically-set composition image is prohibited for an image in which either the computed zoom magnification ratio or the computed shift amount falls outside of a variable range for the zoom magnification ratio for the lens or the shift amount for the light-axis shifting unit.

10. The image pickup device according to claim 1, wherein the image is captured to have a composition with the zoom magnification ratio and the shift amount set at the time of photography in addition to the automatically-set composition image.

11. An image pickup method, comprising the steps of:
  detecting a specified part of a target subject from an image of electric signals obtained by a solid state image sensor which performs photoelectric conversion of an incident light to electric signals;
  computing a zoom magnification ratio for a lens unit and a shift amount of the incident light position for a light-axis shifting unit based on the detected size and position of the specified part of the target subject, such that the specified part has a predetermined size and is positioned in a predetermined position;
  setting the zoom magnification ratio of the lens unit to the computed zoom magnification ratio and the shift amount of the incident light position for the light-axis shifting unit to the computed shift amount; and
  capturing an automatically-set composition image containing the specified part of the target subject having the predetermined size and the predetermined position.

12. The image pickup method according to claim 11, wherein the automatically-set composition image contains the specified part such that the center of the specified part is positioned in the upper half of the image.

13. The image pickup method according to claim 11, wherein the step of computing a zoom magnification ratio and a shift amount computes the zoom magnification ratio and the shift amount for a plurality of images having different view angles; and
  the step of capturing an automatically-set composition image captures a plurality of the automatically-set composition images with the different view angles.

14. The image pickup method according to claim 11, wherein the automatically-set composition image contains at least one of roughly the whole of the target subject, roughly a half of the target subject including the specified part, and the specified part as a main component of the automatically-set composition image.

15. The image pickup method according to claim 11, wherein a distance between the line passing the center of the image in the horizontal direction and the line passing the center of the specified part in the horizontal direction is set larger in a wide angle image than in a telescopic image.

16. The image pickup method according to claim 11, wherein the step of detecting a specified part of a target subject includes detecting a plurality of the specified parts of the target subjects; and
  the step of capturing an automatically-set composition image captures a plurality of automatically-set composition images including the plurality of the specified parts of the target subjects.

17. The image pickup method according to claim 16, wherein when a plurality of the specified parts are detected, the step of computing a zoom magnification ratio and a shift amount determines the zoom magnification ratio for the lens and the shift amount of the incident light position for the light-axis shifting unit based on a height of a region containing all of the plurality of the specified parts, a height of a specified part having the largest height, and a height of the whole image to obtain the automatically-set composition image.

18. The image pickup method according to claim 11, wherein the automatically-set composition image contains the specified part at least at one of the left, center, and right positions of the image in the horizontal direction for the same angle of view.

19. The image pickup method according to claim 11, further comprising:
  extracting an automatically-set composition image in which either the computed zoom magnification ratio or the computed shift amount falls outside of a variable range for the zoom magnification ratio for the lens or the shift amount for the light-axis shifting unit; and
  excluding the extracted automatically-set composition image from a photography coverage.

20. The image pickup method according to claim 11, further comprising:
  capturing an image to have a composition with the zoom magnification ratio and the shift amount set at the time of photography in addition to capturing the automatically-set composition image.

21. An image pickup device, comprising:
  an imaging unit which outputs image signals by capturing an image;
  an image processing unit which detects a specified part of a plurality of target subjects from the image which corresponds to the image signals;

a first control unit which controls a size of the plurality of target subjects such that it becomes a predetermined size in the image;
a second control unit which controls a position of the specified part of the plurality of target subjects such that it is positioned at a predetermined position in the image;
a composition setting unit which comprises a plurality of candidate compositions within the image which contain the specified part of the plurality of target subjects having a predetermined size and positioned at the predetermined position;
a determination unit which computes a size and a position of the specified part of the plurality of target subjects at the time of image capturing, and determines whether or not the size and the position of the specified part of the plurality of target subjects within the image match a size and a position of each of the plurality of candidate compositions,
wherein a composition that was determined by the determination unit to be matching one of the plurality of candidate compositions is set as a valid candidate composition, and image capturing is performed by controlling the first control unit and the second control unit such that the specified part of the plurality of target subjects fit the valid candidate composition.

22. An image pickup device, comprising:
an imaging unit which outputs image signals by capturing an image;
a face detection unit which detects a face area of a person as a target subject from the image which corresponds to the image signals;
a first control unit which controls a size of the face area such that it becomes a predetermined size in the image;
a second control unit which controls a position of the face area such that it is positioned at a predetermined position;
a composition setting unit which comprises a plurality of candidate compositions within the image which contain the face area having a predetermined size and positioned at the predetermined position; and
a determination unit which computes a size and a position of the face area at the time of image capturing, and determines whether or not the size and the position of the face area within the image match a size and a position of each of the plurality of candidate compositions,
wherein a composition that was determined by the determination unit to be matching one of the plurality of candidate compositions is set as a valid candidate composition, and when there is a valid candidate composition in which the face area is horizontally shifted in the left or right direction from the center, image capturing is performed by controlling the first control unit and the second control unit such that the composition fits the valid candidate composition in which the face area is shifted in the left or right direction from the center.

23. An image pickup device, comprising:
an aging unit which outputs image signals by capturing an image;
an image processing unit which detects a specified part of a target subject from the image which corresponds to the image signals;
a control unit which controls a magnification ratio to set a size of the specified part of the target subject to a predetermined size within the image
a distance computing unit which computes a distance between the imaging unit and the target subject;
a determination unit which determines whether the target subject is close to or far from the imaging unit,
wherein when an operation button is operated and the target subject is determined as being close to the imaging unit,
when the zoom magnification ratio is at a widest angle, the control unit does not change the zoom magnification ratio, whereas when the zoom magnification ratio is not at the widest angle, the control unit changes the zoom magnification ratio such that the specified part becomes a predetermined size; and
wherein when the target subject is determined as being far from the imaging unit,
when the zoom magnification ratio is at a narrowest angle, the control unit does not change the zoom magnification ratio, whereas when the zoom magnification ratio is not at the narrowest angle, the control unit changes the zoom magnification ratio such that the specified part becomes a predetermined size.

24. An image pickup device, comprising:
an imaging unit which outputs image signals by capturing an image;
a face detection unit which detects a face area of a person as a target subject from the image which correspond to the image signals;
a control unit which controls a magnification ratio to set a size of the face area to a predetermined size within the image;
a distance computing unit which computes a distance between the imaging unit and the target subject: and
a determination unit which determines whether the target subject is close to or far from the imaging unit,
wherein when an operation button is operated and the target subject is determined as being close to the imaging unit,
when the zoom magnification ratio is at a widest angle, the control unit does not change the zoom magnification ratio, whereas when the zoom magnification ratio is not at the widest angle, the control unit changes the zoom magnification ratio in a direction towards which only an upper half of an entire body of the target subject is placed within the image, and
wherein when the target subject is determined as being far from the imaging unit,
when the zoom magnification ratio is at a narrowest angle, the control unit does not change the zoom magnification ratio, whereas when the zoom magnification ratio is not at the narrowest angle, the control unit changes the zoom magnification ratio in a direction towards which only an upper half of an entire body of the target subject is placed within the image.

25. An image pickup device, comprising:
an imaging unit which outputs image signals by capturing an image;
an image processing unit which detects a specified part of a target subject from the image which corresponds to the image signals;
a first control unit which controls a size of the specified part of the target subject such that it becomes a predetermined size in the image;
a second control unit which controls the specified part of the target subject such that it is positioned at a predetermined position in the image;
a composition setting unit which comprises a plurality of candidate compositions within the image which contain the specified part of the target subject having a predetermined size and positioned at the predetermined position; and a determination unit which computes a size and a position of the specified part of the target subject at the time of image capturing, and determines whether or not the size and the position of the specified part within the image match a size and a position of each of the plurality of candidate compositions, wherein a composition that was determined by the determination unit to be matching one of the plurality of candidate compositions is set as a valid candidate composition, and image capturing is performed by controlling the first control unit and the second control unit such that the specified part of the target subject fits the valid candidate composition.

* * * * *